United States Patent
Slusarz

[11] Patent Number: 6,110,093
[45] Date of Patent: *Aug. 29, 2000

[54] VARIABLE DIAMETER ROLLER

[75] Inventor: Christopher John Slusarz, Lebanon, Me.

[73] Assignee: Heidelberger Druckmaschinen AG, Heidelberg, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/109,744

[22] Filed: Jul. 6, 1998

[51] Int. Cl.[7] ................................ B31F 1/00; B60B 9/00
[52] U.S. Cl. ................................ 493/416; 492/21; 492/48
[58] Field of Search ............................ 493/416; 492/21, 492/48, 36

[56] References Cited

U.S. PATENT DOCUMENTS

| | | |
|---|---|---|
| 4,792,076 | 12/1988 | Grunder . |
| 4,936,561 | 6/1990 | Mukai . |
| 5,039,076 | 8/1991 | Fischer . |
| 5,127,323 | 7/1992 | Lindblom . |
| 5,142,758 | 9/1992 | Delhaes ..................................... 492/21 |
| 5,151,737 | 9/1992 | Johnson et al. .......................... 492/21 |
| 5,201,701 | 4/1993 | Roettger et al. . |
| 5,273,515 | 12/1993 | Fenske .................................... 493/416 |
| 5,313,883 | 5/1994 | DiGenova ................................ 492/21 |
| 5,316,798 | 5/1994 | Tittgemeyer ............................. 492/48 |
| 5,522,785 | 6/1996 | Kedl et al. ............................... 492/21 |

FOREIGN PATENT DOCUMENTS

| | | |
|---|---|---|
| 0 527 293 | 2/1993 | European Pat. Off. . |
| 0 638 500 | 2/1995 | European Pat. Off. . |
| 0747312A2 | 12/1996 | European Pat. Off. . |

*Primary Examiner*—John Sipos
*Assistant Examiner*—Steven Jensen
*Attorney, Agent, or Firm*—Burns, Doane, Swecker & Mathis, L.L.P.

[57] ABSTRACT

The present invention is related to a roller having a mantle. The mantle is expandable in a radial direction to allow for changes in diameter of the roller. The mantle of tubular shape is provided with a pattern of openings along its circumference.

25 Claims, 3 Drawing Sheets

VARIABLE DIAMETER ROLLER

FIELD OF THE INVENTION

The present invention is related to a variable diameter roller for applications in technical fields in which the ideal roller diameter is of high importance.

BACKGROUND OF THE INVENTION

U.S. Pat. No. 4,936,561 is related to an apparatus for adjusting the diameter of a folding drum in a rotary press. The folding drum apparatus generally includes bands, slide bases, screw rolls and sun gears, a differential device and a mechanism for operating the differential device. The slide bases are formed with internal threads and support the bands. The screw rods fitted in the internal threads have pinion gears. The sun gears are concentric with the folding drum, mesh with the pinion gears and are rotatable with respect to the folding drum. The operating mechanism changes phases of the sun gears with respect to the folding drum. Then, the screw rods rotate, and the slide bands expand and contract thus adjusting the effective diameter of the folding drum to provide for a presetting of the folding machine.

U.S. Pat. No. 5,201,701 concerns an adjustable folding cylinder system. To provide close coupling between movable elements such as segments capable of varying the effective diameter of a folding blade cylinder or a movable jaw of a folding jaw cylinder, a first gear element is coupled via a positioning spindle to the respective movable element. A second gear element is coupled to the spindle and further rotationally coupled to the cylinder shaft. A positioning or adjustment gearing, for example a differential or a planetary gearing, is positioned in close vicinity to a side wall of the machine, facing the respective cylinder. The positioning gearing is operable to be controlled to change the relative angular relationship between input (or received rotation) and output (or delivered rotation), and is coupled to the second gear element to receive rotation therefrom and to the first gear element to deliver rotation and additional adjustment movement thereto. The adjusting gearing which superimposed adjusting or positioning movement is controlled by a positioning control unit such as hand wheel or a remote positioning control motor coupled thereto by a gear and controlled for example by a suitable electrical—electronic control unit. The control unit can receive input data signals relating adjusting movement to, for example thickness of paper products being folded, number of paper products in a stack and the like.

U.S. Pat. No. 5,039,076 concerns a folder with at least two folding cylinders having cooperating folding members in the form of folding blades and folding jaws. The folder is intended for processing products of very different thicknesses. At least one folding cylinder has circumferential sections which can be adjusted in the radial direction.

Finally, European Patent document 0 747 312 A2 is related to a folding apparatus superstructure for feeding at least two webs of flat material to a cylinder unit of the folding apparatus. The superstructure includes at least two take-off roller assemblies, each take-off roller assembly including a corresponding take-off roller rotatably mounted on the superstructure. At least one mantling is provided for mounting on an outer surface of each take-off roller in order to adjust a diameter of the corresponding take-off roller assembly. A drive assembly is provided for driving the at least two take-off roller assemblies, each of the at least two take-off roller assemblies having a respective circumferential velocity which is a function of the adjusted diameter of the take-off roller assembly.

It has been found when transporting books in the tapes that those books have a tendency to opening. This problem is caused by driven tape rolls or rollers, the rolls of inside tapes moving on a different radius as compared to an outside tape. The books or signatures partially open within the tapes, which has a detrimental affect on delivery quality.

SUMMARY OF THE INVENTION

The present invention is directed to enabling a press operator to run a job with an ideal roll or roller diameter suitable for each job.

A further object of the present invention is to make a roller body elastic enough to allow for a change of its diameter.

A still further object of the invention is to change the roll or roller diameter when the product is being changed, thus enhancing product quality.

According to exemplary embodiments of the present invention, a roller comprises a mantle which is:

expandable in a radial direction; and of a tubular shape having a pattern of openings assigned thereto.

In an alternate embodiment, the mantle can be provided with enough elasticity to change its diameter, but can be rigid enough to keep a constant diameter across its respective length. Since this mantle is expandable in a radial direction, a desired roll diameter can be adjusted according to the requirements of respective production run without changing the mantle of the respective rollers.

Furthermore, an exemplary mantle according to the present invention can be mounted on supports. The pattern of openings on the circumference of the mantle includes a plurality of openings which extend in an axial direction of the mantle. The axially extending openings extend within the mantle, whereas other openings of the pattern can open towards one of the lateral edges of the mantle. Thus, an elasticity can be created on the mantle allowing for an expansion of the tubular shaped mantle. The rigidity of the mantle is preserved by various bridges of material between the adjacent openings. On an inner circumference of the mantle, inclined annular shaped portions can be provided, the portions allowing for a radial expansion of said mantle.

The mantle can, for example, be made of a metal tubing or of a plastic material. To prevent debris from entering the roll, the axially extending openings can be filled with a synthetic rubber material.

According to an exemplary embodiment of the invention, radially extending supports for the mantle can be slidable in an axial direction relative to a central shaft extending between the side frames. A radially extending center support of the mantle can be fixed with respect to its movement in an axial direction, and thus prevent the roller from moving from end to end. The sliding movement of said supports allows for a radial expansion of the mantle.

The central shaft is provided axially through the mantle, and includes a first, a center and a third shaft portion, through each of which an adjustment rod extends. The adjustment rod includes engaging portions to which outer supports of said mantle are fastened. The connection between the outer supports and the engaging portions is achieved with mounting elements which extend through openings of the shaft sections, thus connecting the outer supports to the adjustment rod. The adjustment rod includes a left hand thread and right hand thread respectively to allow for simultaneous movement for both supports.

Consequently, upon rotation of the adjustment rod (for example, by a hand wheel or an electrical device) both outer supports either move towards each other, thus expanding the mantle diameter or from each other thus reducing the mantle diameter. The inner circumference of the tubular shaped mantle includes two annular portions, provided with an inclined portion. The supports are provided on their outer surfaces with the corresponding inclination in opposite sense. Thus, by axial movement of the supports towards the inclined annular portions on the inner circumference on the mantle, the mantle increases or decreases its diameter.

This effect can be used to adjust a tape roller's diameter to achieve optimal operation requirements for conveying books or signatures in an apparatus for processing sheet like articles, such as a folder apparatus.

BRIEF DESCRIPTION OF THE DRAWINGS

Other objects, characteristics and advantages of the present invention will become apparent to those skilled in the art in view of the description and accompanying drawings, in which.

DETAILED DESCRIPTION OF PREFERRED EMBODIMENTS

Figure 1:
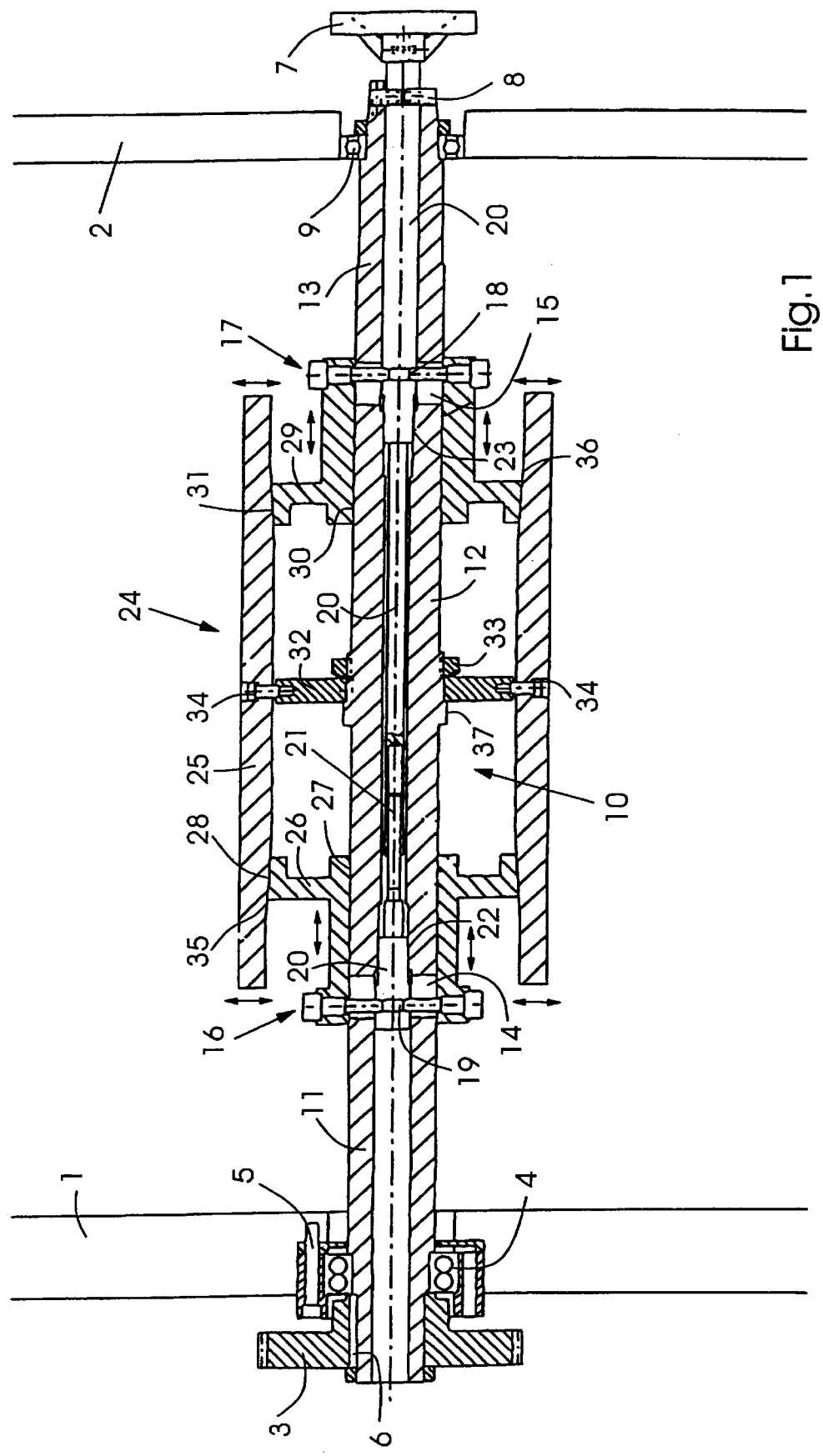
FIG. 1 shows a longitudinal cross-sectional view along the center line of a roller according to an exemplary embodiment of the present invention.

Referring to FIG. 1 an exemplary tape roller 24 is supported by a support shaft 10, the ends of which are journaled by bearings 4 and 9 in respective side frames 1, 2 of, for example, a folder apparatus. In the exemplary embodiment shown in FIG. 1, the bearings 4 and 9 respectively are ball bearings, one of which is secured by means of a securing screw 5 to the side frame 1. The shaft is rotated by a driving gear 3, secured on the first shaft portion 11 of shaft 10 via a key 6 and an appropriate locking nut. On the opposite side frame 2, for example, a hand wheel 7 is mounted and secured via a locking collar 8 to a third shaft portion 13, journaled in the side frame 2 by a bearing 9.

The shaft 10 extends along a longitudinal axis of the mantle, and includes the first shaft portion 11, a second central shaft portion 12, and a third shaft portion 13. The first and third shaft portions 11, 13 respectively are journaled in the side frames 1, 2.

The center portion 12 forms a basis on which outer supports 26, 29 are mounted, allowing for sliding movement thereof. Outer supports 26, 29 which support the continuous mantle 25, extend annularly about the center shaft portion 12, and are apt to move as inclined by the double arrows. Being able to move axially on the respective sliding portions 27, 30, respectively, the outer supports 26, 29 are provided with respective inclined portions 28, 31 corresponding to first and second inclined portions 35, 36 provided on the inner circumference of the mantle 25. Mounting elements 16, 17 mounted on the outer supports 26, 29 connect the outer support 26, 29 respectively to engaging portions 18, 19 respectively provided on an adjustment rod 20. The mounting elements 16, 17 can be a pair of pins or screws or the like which extend through opening portions 14, 15 on the respective shaft portions 11, 12, and 13.

The adjustment rod 20 extends through all portions 11, 12, and 13 respectively of the shaft 10, but only partially into the shaft portion 11 journaled in side frame 1. The rotational movement of the adjustment rod 20 can, for example, be induced via the hand wheel 7 as shown in the embodiment of FIG. 1. On the other hand, a rotational movement of the adjustment rod 20 can be achieved by any other means, including for example a remote drive means such as an electric motor, equipped with a control means to allow for presetting the diameter of the expandable roll, to achieve a roller's diameter matching the requirements best suited for the respective print and conveying job of the sheet like material. Adjustment rod 20 is provided with two thread portions 22, 23 respectively. The right hand of thread portion 22 as shown in FIG. 1 is arranged below the outer support 26, whereas the left hand thread of portion 23 is arranged below outer support 29. Within the center portion 12, through which the adjustment rod 20 extends, the adjustment rod 20 includes a spline 21 within which portions of the respective adjustment rod 20 are splined together and allowing for lengthening of adjustment rod 20. Upon rotation of adjustment rod 20, the threaded portions 22, 23 respectively will move the engaging portions 18, 19 within the adjustment rod 20 in the same sense; either towards each other or away from each other.

Depending on the length of threaded portions 22, 23 and their respective pitches, the rate and extent of the lateral movement of engaging portions 18, 19 is determined. As the mounting elements 16, 17 connect the outer supports 26, 29 to adjustment rod 20, a lateral movement of the engaging portions 18, 19 upon rotation of the adjustment rod 20 will cause a sliding movement of outer support 26, 29 in an axial direction, parallel to shaft 10. Consequently, inclined portions 28, 31 respectively on outer supports 26, 29 will move either towards each other or away from each other. This movement in turn will cause both outer supports 26, 29 to move relative to the first and second inclined portions 35, 36 extending annularly about the inner circumference 39 in FIG. 2 of mantle 25. The movement of mantle 25 in a radial direction is indicated in FIG. 1 by double arrows extending in a vertical direction near the lateral edges of mantle 25. If the outer supports 26, 29 move away from each other in axial sliding movement on adjustment rod 20, the diameter of the mantle 25 will decrease, since the inclined portions have the tendency to disengage from one another. On the other hand, if the outer supports 26, 29 move axially towards each other, the diameter of the mantle 25 is increased, since the inclined portions 28, 31, and 35, 36 move into one another.

The center support 32 is secured to the mantle 25 by means of securing screws 34 or a pin and allows for radial movement of the mantle 25 relative to shaft 10. The center portion 12 of shaft 10 is provided with a fixing portion 37 about which the center support 32 extends the center support being kept in its axial position by a locking nut 33 secured to fixing portion 37. The center support 32 keeps the expandable mantle 25 from traveling between the respective end portions of shaft 10 during change of its diameter.

Figure 2:
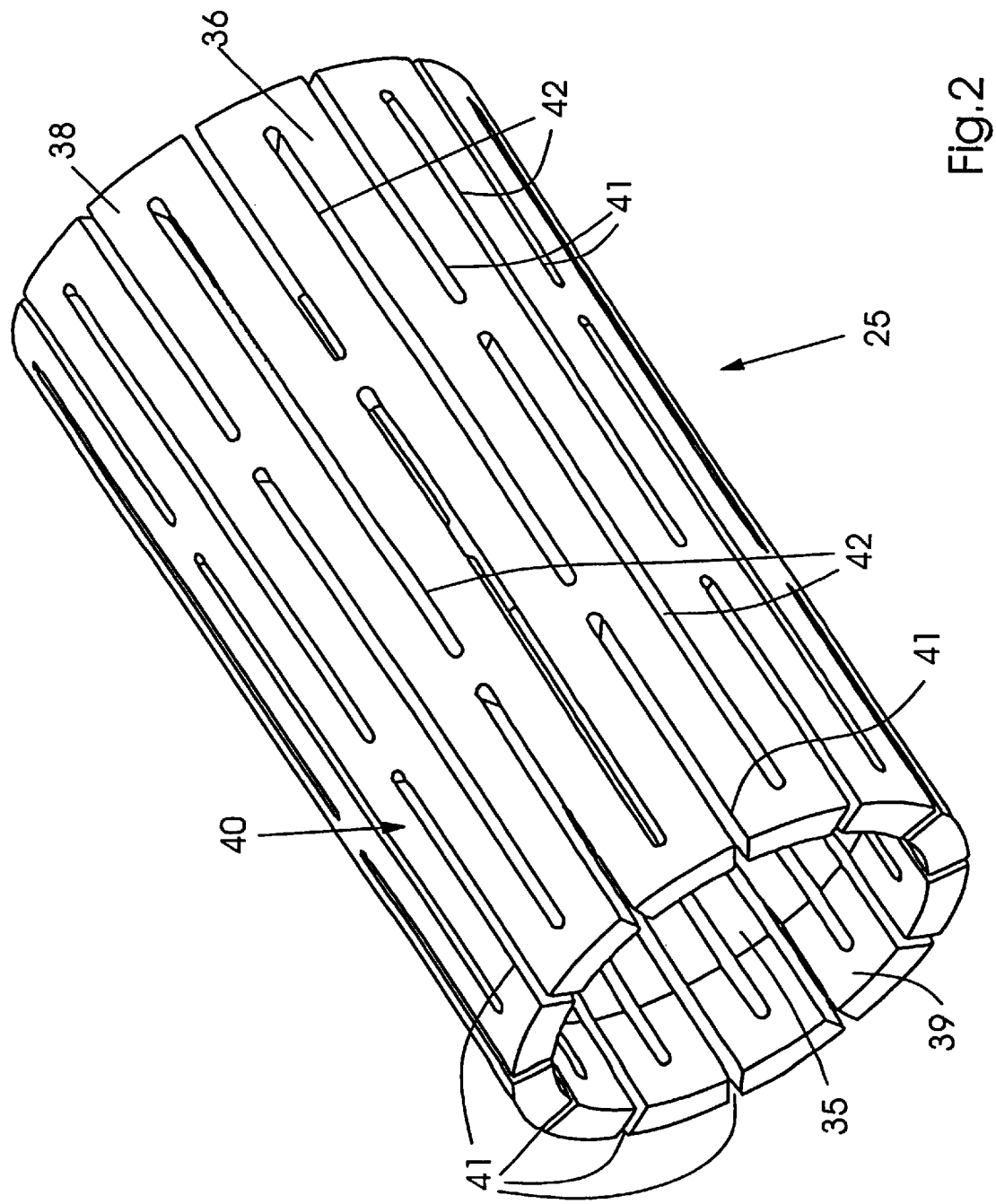
FIG. 2 shows a perspective view of the mantle of the roller, showing an exemplary pattern of openings.

In FIG. 2 a perspective view of the mantle 25 of the roller 24 is given, showing the mantle being provided with a pattern of slot like openings 41, 42. The tubular shaped mantle 25 includes an inner and an outer surface 38, 39 respectively. The mantle 25 can, for example, be machined of a metal material or plastics material or any other desired material. On the inner circumference of the mantle 25, the annularly extending inclined portions 35, 36 are indicated, which are supported by outer support, 29 of FIG. 1.

The FIG. 2 pattern 40 of openings 41, 42 on the outer circumference 38 of mantle 25 includes slot shaped openings 41, 42 extending in an axial direction of mantle 25. The slot pattern 40 of openings 41, 42 includes openings 42 which extend within the mantle 25 having no open lateral edges and openings 41 having open edges towards lateral edges of the mantle 25. In the embodiment shown in FIG. 2, the pattern 40 has openings 42 having no open edges each in line with an opening 41 having open edges. This pattern 40 extends around the entire outer circumference 38 of mantle 25. By means of pattern 40, an elasticity of mantle 25 and a rigidity of the mantle 25 can be achieved for changes in diameter. The respective openings 41, 42 of slot pattern 40 are filled with a synthetic rubber material having a elastic properties. Upon expansion of mantle 25, this material prevents debris from entering said openings 41, 42 of the mantle 25. The synthetic material filled into the openings 41, 42 can be any material having a elastic properties and being responsive to size changes of pattern 40 of said openings 41, 42.

Figure 3:
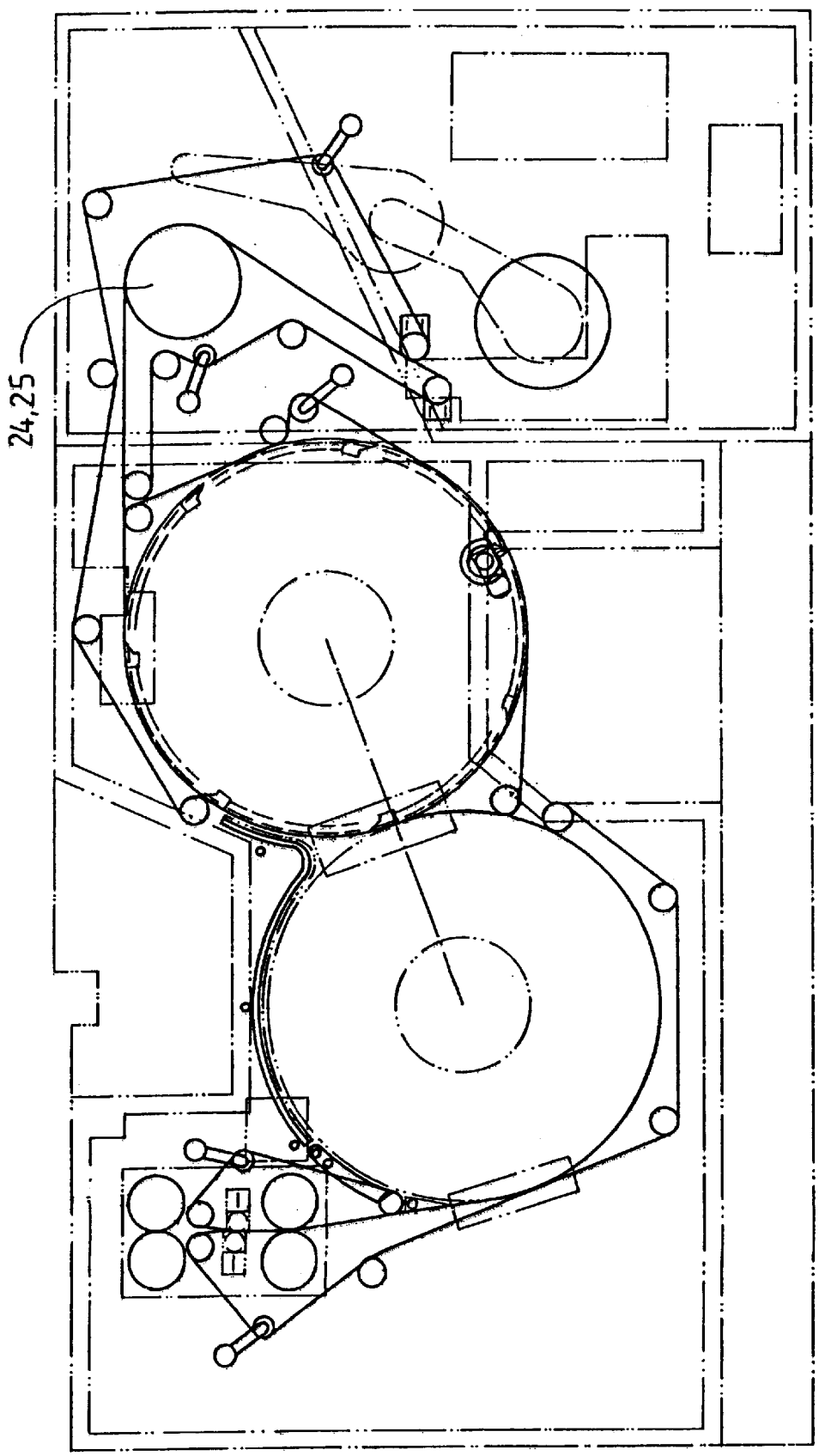
FIG. 3 schematically shows an exemplary embodiment of a folder delivery and a folder apparatus, in which the roller has an expandable diameter.

FIG. 3 shows a side view of an exemplary folder apparatus for a rotary printing press. Signatures being severed from a web of material are cross folded, thus forming books being conveyed through the folder apparatus or on respective sets of belts or tapes or the like. The books are either conveyed on tapes or belts or travel on a circumference of folding cylinders such as a folding blade cylinder cooperating with a jaw cylinder. The signatures or books are conveyed into a delivery section where they are supported by tapes.

The tapes or belts travel around roller 24 having an expandable mantle 25 for adjusting the respective diameter of the mantle 25 of the roller according to the book requirements to prevent them from opening up during transportation on said belts.

The presetting of the diameter can be achieved via a remote control as set forth in FIG. 1, the diameters being adapted to best match the production requirements. The expansion of the diameter of the mantle 25 can be performed, for example, while presetting variables such as ink keys and angle bar positions during webbing up the press, resulting in high quality products from the beginning when starting up the press.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A Roller, comprising:
   a mantle having a tubular shape and being rigid to maintain a constant diameter across its length when expanded;
   supports for adjusting a diameter of said mantle in a radial direction to maintain a constant diameter across its length when expanded; and
   a pattern of openings formed along an entire length of said mantle to provide elasticity for expansion of said mantle diameter, wherein the pattern includes openings that extend within the mantle and have no open lateral edges, and openings that have open edges towards lateral edges of the mantle, so that the roller when expanded will expand uniformly and have a uniform diameter along its axial length.

2. Roller according to claim 1, wherein said mantle is mounted on said supports.

3. Roller according to claim 1, wherein said mantle includes inclined portions.

4. Roller according to claim 3, wherein said inclined portions are provided on the inner circumference of said mantle.

5. Roller according to claim 1, wherein said mantle is a metal tubing.

6. Roller according to claim 1, wherein said openings are filled with a synthetic rubber.

7. Roller according to claim 2, wherein outer supports of said roller are slidably mounted.

8. Roller according to claim 7, wherein said supports are slidable in an axial direction relative to a shaft.

9. Roller according to claim 8, wherein a center support is fixed relative to said shaft.

10. Roller according to claim 9, wherein said support is secured to said mantle.

11. Roller according to claim 9, wherein said center support allows for radial movement of said mantle.

12. Roller according to claim 8, wherein said shaft includes a plurality of sections.

13. Roller according to claim 12, wherein said shaft includes a first, a center, and a third shaft portion.

14. Roller according to claim 12, wherein an adjustment rod extends through said shaft.

15. Roller according to claim 14, wherein said adjustment rod includes engaging portions.

16. Roller according to claim 12, wherein said shaft comprises openings through which mounting elements extend.

17. Roller according to claim 16, wherein said mounting elements connect said outer supports to said adjustment rod.

18. Roller according to claim 14, wherein said adjustment rod includes a right hand thread portion and a left hand thread portion, engaging the ends of said outer portion of said shaft.

19. Roller according to claim 7, wherein said outer supports each include a first inclined portion and a second inclined portion, respectively, which are slidably engaged with said mantle, and wherein said outer supports are movable away from and toward each other to cause the mantle to expand or contract, respectively.

20. Roller according to claim 19, wherein the inclination of said first and second inclined portions respectively are oriented towards each other.

21. Roller according to claim 19, wherein the inclined portions are oriented opposite to each other.

22. Roller of claim 1, wherein at least one of the openings having no open lateral edges is in line with at least one of the openings having an open edge towards a lateral edge of the mantle.

23. Roller of claim 1, wherein the openings in the pattern extend in an axial direction of the mantle.

24. A delivery section of a folder apparatus, comprising:
   tape rollers;
   a mantle included in said tape rollers, having a tubular shape, being rigid to maintain a constant diameter across its length and having a pattern of openings along an entire length of said mantle to provide elasticity for expansion of said mantle diameter; and
   supports for adjusting a diameter of said mantle in a radial direction to maintain a constant diameter across its length when expanded; wherein
   the pattern includes openings that extend within the mantle and have no open lateral edges, and openings that have open edges towards lateral edges of the mantle.

25. Folder apparatus having various tape sections for conveying flat products, the tapes being supported by rollers, said folder apparatus comprising:

a tape roller having a mantle, having a tubular shape, and being rigid to maintain a constant diameter across its length;

supports for adjusting a diameter of said mantle in a radial direction to maintain a constant diameter across its length when expanded; and a pattern of openings formed along an entire length of said mantle to provide elasticity for expansion of said mantle diameter; wherein the pattern includes openings that extend within the mantle and have no open lateral edges, and openings that have open edges towards lateral edges of the mantle.

* * * * *